US012583725B2

(12) United States Patent
Isahai

(10) Patent No.: US 12,583,725 B2
(45) Date of Patent: Mar. 24, 2026

(54) LIQUID FILLING APPARATUS

(71) Applicant: YOSHINO KOGYOSHO CO., LTD., Tokyo (JP)

(72) Inventor: Mitsuaki Isahai, Tokyo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 0 days.

(21) Appl. No.: 18/862,814

(22) PCT Filed: May 10, 2023

(86) PCT No.: PCT/JP2023/017625
§ 371 (c)(1),
(2) Date: Nov. 4, 2024

(87) PCT Pub. No.: WO2024/024210
PCT Pub. Date: Feb. 1, 2024

(65) Prior Publication Data
US 2025/0282601 A1 Sep. 11, 2025

(30) Foreign Application Priority Data
Jul. 29, 2022 (JP) ................................ 2022-122334

(51) Int. Cl.
*B67C 3/26* (2006.01)

(52) U.S. Cl.
CPC ................................ *B67C 3/2608* (2013.01)

(58) Field of Classification Search
CPC ................................................ B67C 3/2608
See application file for complete search history.

(56) References Cited

U.S. PATENT DOCUMENTS 9,889,596 B2 * 2/2018 Gillet ...................... B29C 49/58
11,504,897 B2 * 11/2022 Shiokawa ............... B29C 49/12
2005/0199314 A1 9/2005 Ruble et al.
2017/0008216 A1 * 1/2017 Suyama .................. B29C 49/46

FOREIGN PATENT DOCUMENTS

JP S63-54700 U 4/1988
JP S63-137796 U 9/1988
JP H06-56122 A 3/1994
JP 2019-130799 A 8/2019
JP 2020-196132 A 12/2020
WO 2018/198449 A1 11/2018
WO 2019/150701 A1 8/2019

OTHER PUBLICATIONS

Jun. 20, 2023 International Search Report issued in International Patent Application No. PCT/JP2023/017625.
Jul. 22, 2025 Office Action issued in Japanese Patent Application No. 2022-122334.
Feb. 4, 2025 International Preliminary Report on Patentability issued in International Patent Application No. PCT/JP2023/017625.

* cited by examiner

*Primary Examiner* — Timothy L Maust
(74) *Attorney, Agent, or Firm* — Oliff PLC

(57) ABSTRACT

A liquid filling apparatus that fills a filled object with a liquid, the liquid filling apparatus includes: a liquid supply portion; a nozzle that includes a supply port and a sealing surface; a driving rod arranged inside a liquid supply channel so as to be freely movable in a vertical direction; and a sealing member fixed to the driving rod, wherein a gap is provided between a support surface of the driving rod and a facing surface of the sealing member.

2 Claims, 7 Drawing Sheets

LIQUID FILLING APPARATUS

TECHNICAL FIELD

The present disclosure relates to a liquid filling apparatus that fills a filled object with a liquid.

BACKGROUND

In liquid blow molding apparatuses that manufacture synthetic resin containers by liquid blow molding, in which liquids are used as pressurizing media for blow molding, liquid filling apparatuses are used to fill (supply) pressurized liquids into preforms that are objects to be filled.

For example, Patent Literature (PTL) 1 describes a liquid filling apparatus including: a liquid supply portion configured to supply a liquid into a liquid supply channel; a nozzle that includes a supply port connected to the liquid supply channel and a sealing surface provided on an upstream side of the supply port; a driving rod arranged inside the liquid supply channel so as to be freely movable in a vertical direction; and a sealing member that has an abutting surface facing the sealing surface and that is fixed to the driving rod, wherein the abutting surface of the sealing member abuts the sealing surface to thereby close the supply port, and during liquid blow molding, the driving rod moves upward, and the abutting surface of the sealing member moves away from the sealing surface to thereby open the supply port, so that a pressurized liquid is supplied into a preform.

CITATION LIST

Patent Literature

PTL 1: JP 2019-130799 A

SUMMARY

Technical Problem

In the aforementioned conventional liquid filling apparatus, the inside of the liquid supply channel is always filled with the liquid in order to perform filling while pressurizing the liquid, so it is necessary to seal the supply channel with the sealing member. It is therefore preferable to use a synthetic resin material as the sealing member in order to improve sealing performance of the supply port by the sealing member.

With a configuration in which a synthetic resin material is used as the sealing member, however, in a case in which hot water is supplied into the liquid supply channel for cleaning or the like, or in a case in which a high-temperature liquid is filled into the filled object, for example, when such a high-temperature liquid is supplied into the liquid supply channel, the abutting surface of the sealing member is affected by heat and the sealing performance deteriorates, possibly resulting in leakage of the liquid from the supply port. When the liquid leaks from the supply port, the mold and the container as a product are spoiled by the leaked liquid.

To address this, it is possible to make the sealing member from metal, instead of synthetic resin. When the sealing member is made of metal, however, it is difficult to ensure sealing performance, and there is a risk of metal powder being mixed in with the liquid.

It would be helpful to provide a liquid filling apparatus capable of ensuring sealing performance with a synthetic resin sealing member, even when a high-temperature liquid is supplied into the liquid supply channel.

Solution to Problem

A liquid filling apparatus according to the present disclosure is a liquid filling apparatus that fills a filled object with a liquid, the liquid filling apparatus including:

- a liquid supply portion configured to supply the liquid into a liquid supply channel;
- a nozzle that includes a supply port connected to the liquid supply channel and a sealing surface provided on an upstream side of the supply port;
- a driving rod that includes a support surface facing the nozzle and an engaged portion provided on the support surface and that is arranged inside the liquid supply channel so as to be freely movable in a vertical direction; and
- a synthetic resin sealing member, made of synthetic resin, that includes an abutting surface facing the sealing surface, a facing surface facing the support surface and an engaging portion provided on the facing surface, and that is configured to move along with the driving rod, by fixed to the driving rod by the engaging portion engages with the engaged portion, between a closed position, in which the abutting surface abuts the sealing surface to thereby close the supply port, and an open position, in which the abutting surface moves away from the sealing surface to thereby open the supply port, wherein
- a gap is provided between the support surface and the facing surface.

In a preferred embodiment of the liquid filling apparatus configured as above,

- the engaging portion includes a male thread portion protruding from the facing surface,
- the engaged portion includes a threaded hole, and
- a dimension in an axial direction of the engaging portion is set to be larger than a dimension in the axial dimension of the engaged portion.

In another preferred embodiment of the liquid filling apparatus configured as above,

- the engaging portion includes a male thread portion protruding from the facing surface,
- the engaged portion includes a threaded hole, and
- a dimension in an axial direction of the engaging portion is set to be equal to a dimension in the axial dimension of the engaged portion, and a spacer member is arranged between an end surface of the engaging portion and a bottom surface of the engaged portion.

In another preferred embodiment of the liquid filling apparatus configured as above, the supply port is configured as a cylindrical shape extending downward from an inner circumferential edge of the sealing surface.

In another preferred embodiment of the liquid filling apparatus configured as above, the liquid filling apparatus further includes:

- an extended portion that is integrally provided at a lower end of the sealing member and that is arranged inside the supply port when the sealing member is in the closed position;
- a draw-in hole that is provided in the extended portion and that includes one end opening at a lower end of the extended portion and another end opening at an outer circumferential surface of the extended portion;

a draw-in channel that is provided in the nozzle and that communicates with the another end opening of the draw-in hole when the sealing member is in the closed position; and a negative pressure supply source connected to the draw-in channel.

Advantageous Effect

According to the present disclosure, a liquid filling apparatus capable of ensuring sealing performance with a synthetic resin sealing member, even when a high-temperature liquid is supplied into the liquid supply channel is provided.

DETAILED DESCRIPTION

In the following, a liquid filling apparatus according to an embodiment of the present disclosure will be more concretely described as illustration with reference to the drawings.

Figure 1:
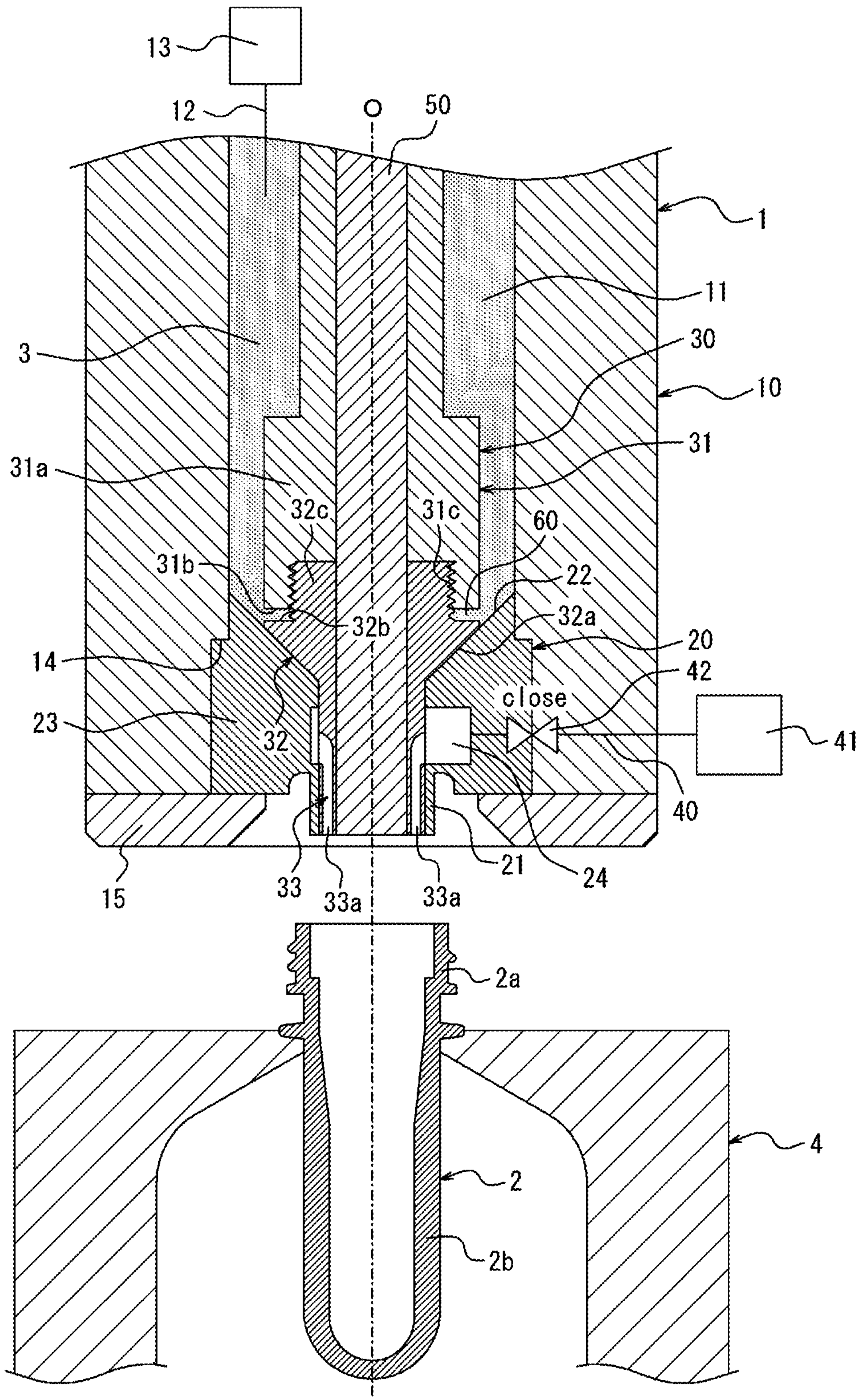
FIG. 1 is an enlarged sectional view illustrating part of a liquid filling apparatus according to an embodiment of the present disclosure.

The liquid filling apparatus 1 of FIG. 1 according to the embodiment of the present disclosure constitutes a liquid blow molding apparatus that blow molds a filled object 2 into a container of a predetermined shape, by filling (supplying) a pressurized liquid 3 into the filled object 2, which is a synthetic resin preform.

In the present embodiment, the filled object 2 is a preform that has been formed into a substantially test tube shape with a mouth 2*a* and a bottomed cylindrical body 2*b* using a synthetic resin material, such a polypropylene (PP) or polyethylene terephthalate (PET). The filled object 2 is heated to a predetermined temperature and placed in a blow molding mold 4 arranged below the liquid filling apparatus 1, with the mouth 2*a* opening upward.

Additionally, the filled object 2 may be a preform of other materials and shapes.

The liquid filling apparatus 1 includes a main body block 10. In the present embodiment, the main body block 10 includes a liquid supply channel 11 extending in a vertical direction inside the main body block 10. A liquid supply portion 13 is connected to the liquid supply channel 11 via a pipe 12. The liquid supply portion 13 is configured by, for example, a plunger pump, and it can supply the liquid 3 pressurized to a predetermined pressure into the liquid supply channel 11 through the pipe 12. The liquid supply portion 13 can also supply a liquid (such as hot water) heated to a predetermined temperature into the liquid supply channel 11 through the pipe 12 when the liquid supply channel 11 is cleaned.

A nozzle 20 is attached to a lower end of the main body block 10. The nozzle 20 includes a supply port 21, which connects to the liquid supply channel 11 and which opens downward, and a sealing surface 22, which is provided on an upstream side (upper side in FIG. 1) of the supply port 21.

In the present embodiment, the supply port 21 has a cylindrical shape extending downward from an inner circumferential edge of the sealing surface 22, so as to be inserted inside the mouth 2*a* of the filled object 2.

The supply port 21 is integrally provided, on the upper side thereof, with a holding portion 23 having a larger diameter than the supply port 21. The nozzle 20 is fixed to the main body block 10, by the holding portion 23 being held between a stepped surface 14 provided on an inner circumferential surface of the main body block 10 and a support block 15 fixed to a lower end of the main body block 10.

The sealing surface 22 is provided as an upper surface of the holding portion 23, and it is a tapered surface that gradually decreases in diameter from upward to downward. Additionally, the sealing surface 22 is not limited to a tapered surface.

The liquid filling apparatus 1 includes a sealing body 30 that opens and closes the supply port 21 of the nozzle 20. The sealing body 30 includes a driving rod 31 and a sealing member 32.

Figure 2:
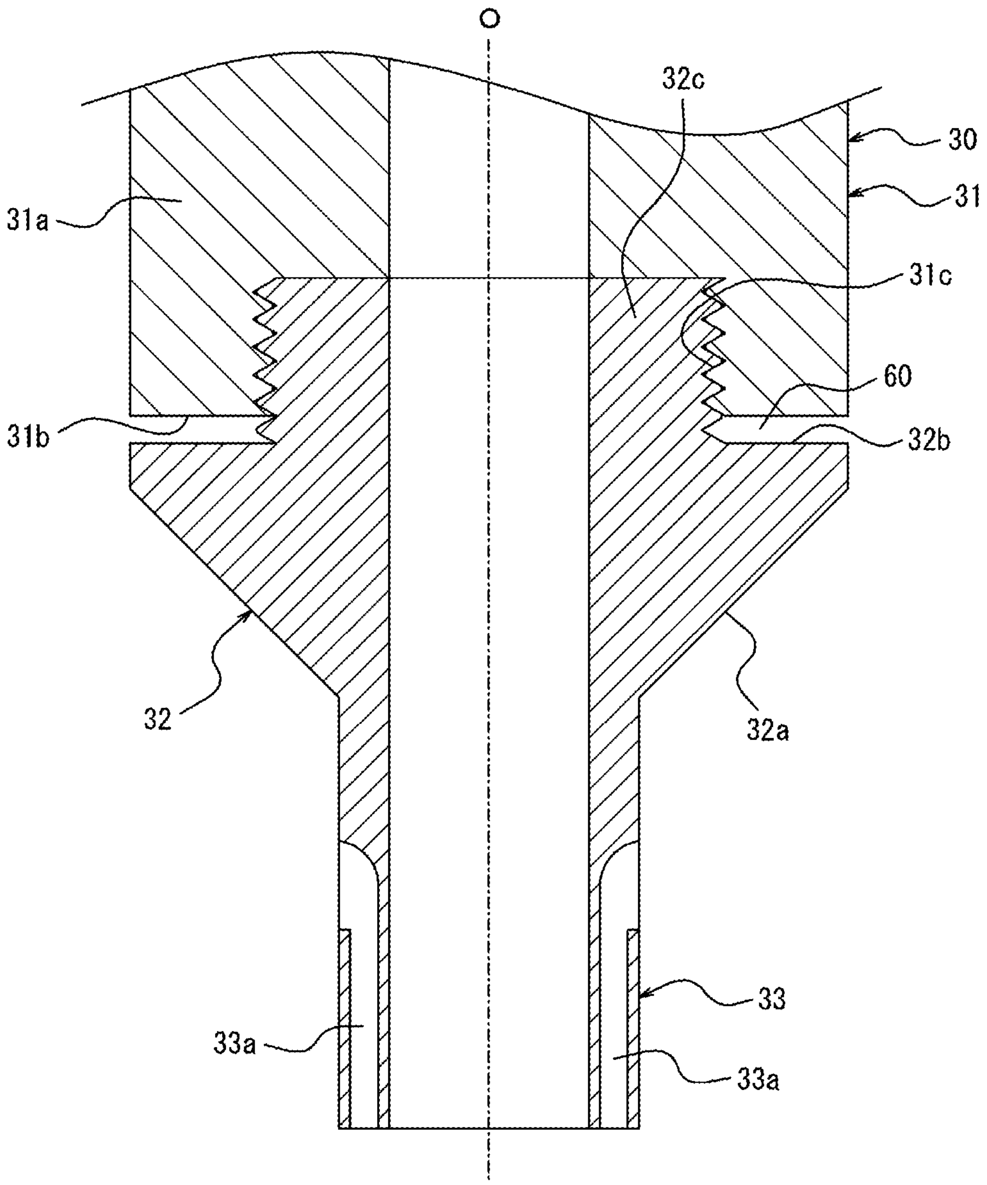
FIG. 2 is an enlarged sectional view illustrating part of a sealing member and a driving rod of FIG. 1.

The driving rod 31 is arranged inside the liquid supply channel 11, and it extends in the vertical direction along an axis O of the liquid supply channel 11. The driving rod 31 is driven by a drive source that is not illustrated and is freely movable in the vertical direction so as to move closer to and away from the nozzle 20. The driving rod 31 is integrally provided, at a lower end portion thereof, with a connecting portion 31*a* having a larger diameter than the upper portion. As illustrated in FIG. 1 and FIG. 2, a lower surface of the connecting portion 31*a* that faces the nozzle 20 is a flat support surface 31*b* that is perpendicular to the axis O. The support surface 31*b* is provided with a threaded hole 31*c* as an engaged portion that is recessed at a predetermined depth coaxially with the axis O.

The sealing member 32 is made of synthetic resin, and it includes an abutting surface 32*a* facing the sealing surface 22, a facing surface 32*b* facing the support surface 31*b* of the driving rod 31, and a male thread portion 32*c* as an engaging portion protruding from the facing surface 32*b* at a predetermined height coaxially with the axis O. In the present embodiment, the abutting surface 32*a* is provided as a lower surface of the sealing member 32 and is a tapered surface with a shape corresponding to the sealing surface 22.

The sealing member 32 is fixed to the connecting portion 31*a* of the driving rod 31, by the male thread portion 32*c* being screw-connected to the threaded hole 31*c* provided in the connecting portion 31*a* of the driving rod 31. This makes the sealing member 32 freely movable along with the driving rod 31 between a closed position (position illustrated in FIG. 1), in which the abutting surface 32*a* abuts the sealing surface 22 to thereby close the supply port 21, and an open position (position illustrated in FIG. 6), in which the abutting surface 32*a* moves away from the sealing surface 22 to thereby open the supply port 21.

The sealing member 32 can also be configured to be integrally provided, at a lower end thereof, with an extended portion 33.

As illustrated in FIG. 2, the extended portion 33 has a cylindrical shape with substantially the same diameter as and coaxial with an inner circumferential surface of the supply port 21, and it extends downward from the inner circumferential edge of the abutting surface 32*a*. The extended portion 33 is arranged inside the supply port 21 when the sealing member 32 is in the closed position. At this time, an outer circumferential surface of the extended portion 33 is in sliding contact or adjacent to the inner circumferential surface of the supply port 21, and an end surface on the downstream side (lower side in FIG. 1) of the extended portion 33 is arranged flush with an end surface on the downstream side of the supply port 21.

Figure 3:
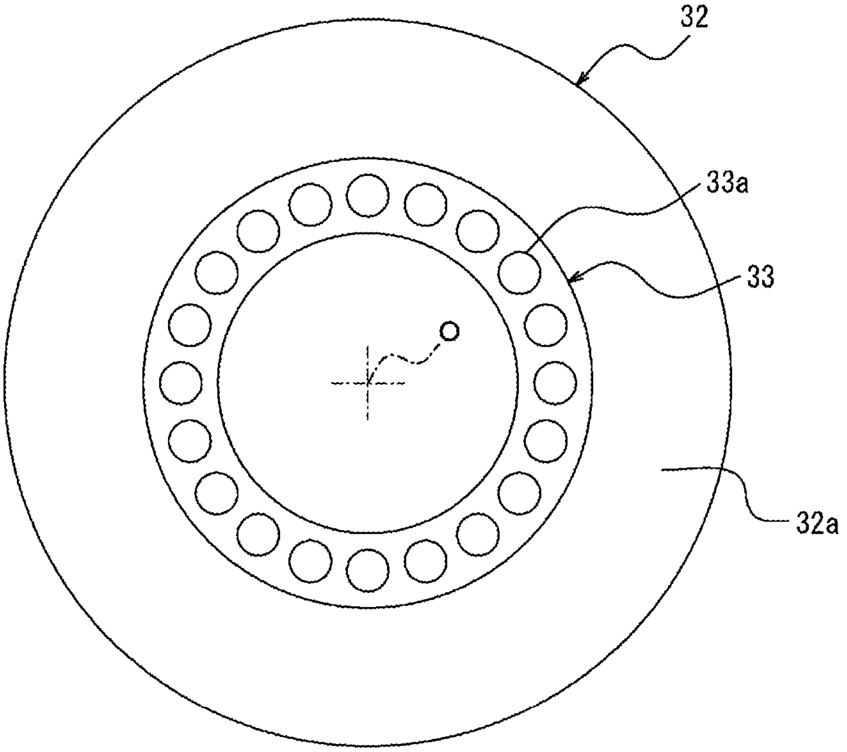
FIG. 3 is a bottom view illustrating the sealing member of FIG. 2.

The extended portion 33 includes draw-in holes 33*a*. Each draw-in hole 33*a* is an L-shaped flow channel with one end opening at a lower end of the extended portion 33 and another end opening at the outer circumferential surface of the extended portion 33. In the present embodiment, the extended portion 33 is provided with a plurality of draw-in holes 33*a* arranged at regular intervals in the circumferential direction around the axis O. Accordingly, as illustrated in FIG. 3, the respective one ends of the plurality of draw-in holes 33*a* are open on a lower end surface of the extended portion 33, while being arranged at regular intervals in the circumferential direction. For convenience, only one draw-in hole 33*a* is denoted with a reference numeral in FIG. 3.

As illustrated in FIG. 1, in a case in which draw-in holes 33*a* are provided in the extended portion 33, a draw-in channel 24 is provided in the nozzle 20. The draw-in channel 24 is provided as an annular groove centered about the axis O on an inner circumferential surface of the holding portion 23 of the nozzle 20, and it is configured to communicate with the respective other ends of the draw-in holes 33*a* when the sealing member 32 is in the closed position.

A negative pressure supply source 41 is connected to the draw-in channel 24 via a pipe 40. The negative pressure supply source 41 is, for example, a vacuum pump. The pipe 40 is also provided with an opening and closing valve 42. The opening and closing valve 42 is configured, for example, by a solenoid valve, and it is controlled to open and close by a control means that is not shown. When the opening and closing valve 42 is opened, the negative pressure supply source 41 communicates with the respective draw-in holes 33*a* via the pipe 40 and the draw-in channel 24, so that negative pressure is supplied to the draw-in holes 33*a*.

The liquid filling apparatus 1 can also be configured to include a stretching rod 50. In this case, the stretching rod 50 is arranged at an axis center of the driving rod 31 and the sealing member 32, that is, the sealing body 30, so as to be freely advance and retreat with respect to the sealing member 32. During liquid blow molding when the pressurized liquid 3 is supplied into the filled object 2, the stretching rod 50 is moved so that it protrudes downward from the sealing member 32, and the filled object 2 is stretched longitudinally by the stretching rod 50, and thus, the filled object 2 can be biaxially stretch blow molded.

Next, procedure for performing liquid blow molding by filling the filled object 2 with the pressurized liquid 3 using the liquid filling apparatus 1 will be described.

As illustrated in FIG. 1, in a state in which the sealing member 32 is in the closed position, the supply port 21 is closed, and the opening and closing valve 42 is closed, the filled object 2, which is an object to be filled with the liquid 3, is placed in the mold 4 so that the mouth 2*a* is coaxial with the supply port 21.

Figure 4:
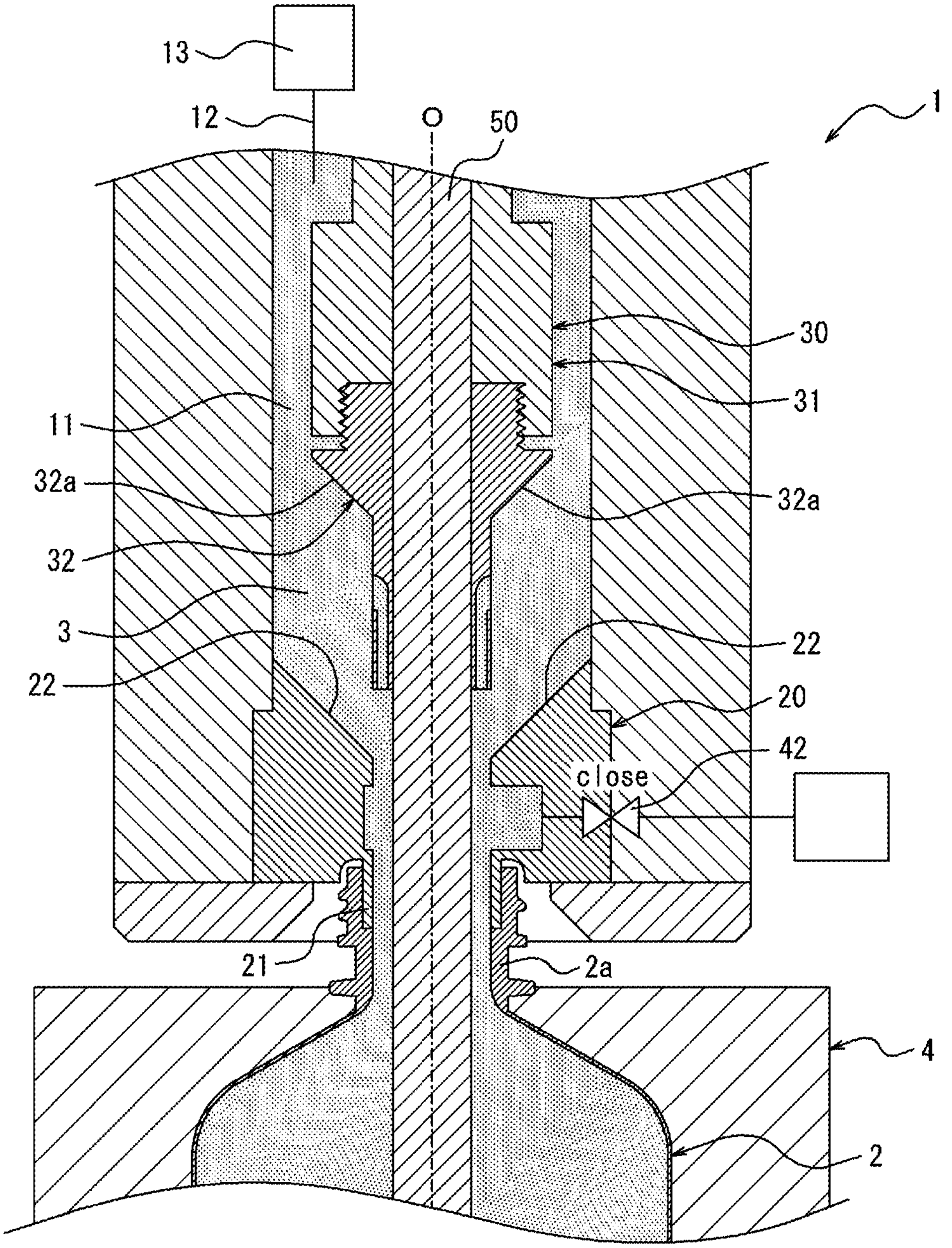
FIG. 4 is a sectional view illustrating the liquid filling apparatus of FIG. 1 in a state in which the sealing member is in an open position and a filled object is being filled with a liquid.

Subsequently, as illustrated in FIG. 4, the main body block 10 is moved downward so that the supply port 21 of the nozzle 20 is fitted into the mouth 2*a* of the filled object 2, and then the sealing body 30 is moved upward by operating the driving rod 31 with the opening and closing valve 42 being closed, to thereby move the sealing member 32 from the closed position to the open position. As a result, the abutting surface 32*a* moves away from the sealing surface 22, the supply port 21 is opened, and the pressurized liquid 3 supplied from the liquid supply portion 13 to the nozzle 20 via the pipe 12 and the liquid supply channel 11 is filled from the supply port 21 into the filled object 2 through the mouth 2*a*, and thus, the body 2*b* of the filled object 2 is stretched. In the configuration in which the stretching rod 50 is provided, the body 2*b* of the filled object 2 is stretched longitudinally by the stretching rod 50 as the stretching rod 50 moves downward. When the filled object 2 is filled with a predetermined amount of the pressurized liquid 3, the filled object 2 is formed into a container of a predetermined shape, and the filling of the liquid 3 into the filled object 2 is completed.

Figure 5:
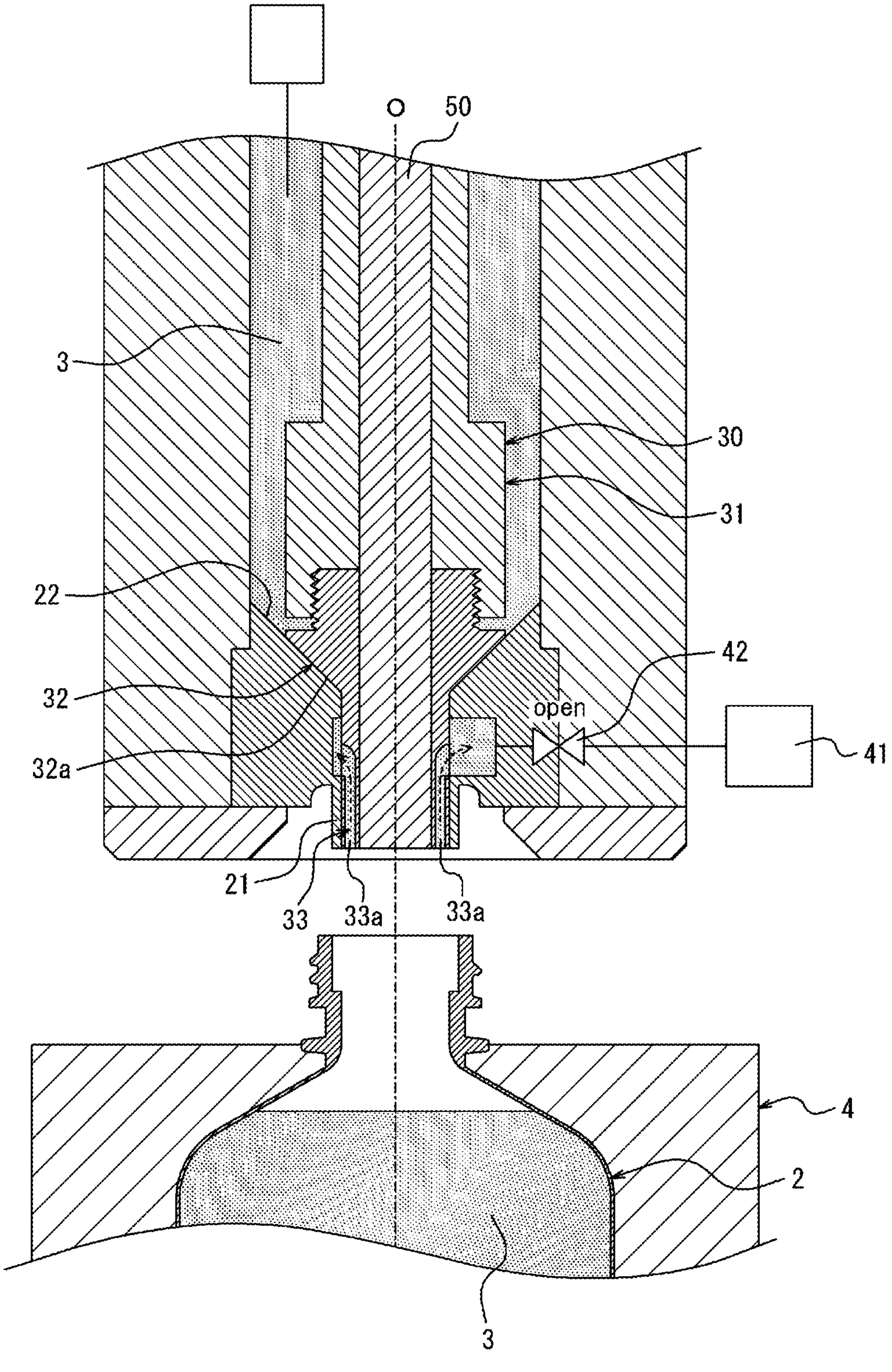
FIG. 5 is a sectional view illustrating the liquid filling apparatus of FIG. 1 in a state in which the sealing member is in a closed position after the filled object is filled with the liquid.

When the liquid 3 has been filled into the filled object 2, as illustrated in FIG. 5, the opening and closing valve 42 is opened with the negative pressure supply source 41 being operated, and the driving rod 31 is operated to move the sealing body 30 downward, to thereby move the sealing member 32 from the open position to the closed position. When the sealing member 32 is in the closed position, the abutting surface 32*a* abuts the sealing surface 22 over the entire circumference, so that the supply port 21 is closed, and the filling of the pressurized liquid 3 into the filled object 2 is stopped. The main body block 10 is then moved upward so as to separate the supply port 21 of the nozzle 20 from the mouth 2*a* of the filled object 2. Additionally, the negative pressure supply source 41 may be left in a state of constant operation if it is being operated when the opening and closing valve 42 is opened, or it may start to operate when the opening and closing valve 42 is opened.

After the sealing member 32 is brought into the closed position and the supply port 21 is closed, the liquid 3 adhering to the end surface of the supply port 21 or the end surface of the extended portion 33 may drip, but because the opening and closing valve 42 is opened and negative pressure is supplied from the negative pressure supply source 41 to the plurality of draw-in holes 33*a* that open on the end surface of the extended portion 33, the liquid 3 adhering to the end surface of the supply port 21 or the end surface of the extended portion 33 is drawn in through the plurality of draw-in holes 33*a*. This prevents liquid dripping from the end surface of the supply port 21 or the end surface of the extended portion 33.

In the liquid filling apparatus 1 according to the present embodiment, the sealing member 32 is made of synthetic resin. For this reason, in a case in which hot water is supplied into the liquid supply channel 11 for cleaning or the like, or in a case in which a high-temperature liquid is filled into the filled object 2, for example, when such a high-temperature liquid 3 is supplied into the liquid supply channel 11, the abutting surface 32*a* of the sealing member 32 may be affected by heat, and the sealing performance may deteriorate.

To address this, in the liquid filling apparatus 1 according to the present embodiment, as illustrated in FIG. 2, a gap 60 is provided between the support surface 31*b* of the driving rod 31 and the facing surface 32*b* of the sealing member 32.

The gap 60 is provided outside the male thread portion 32*c* in an annular shape centered about the axis O and of a constant thickness. The gap 60 is set to be larger than or equal to the amount of elastic displacement in the vertical direction that occurs in the sealing member 32 when the sealing member 32 is held in the closed position under a predetermined load. The gap 60 provided between the support surface 31*b* and the facing surface 32*b* allows the sealing member 32 or the abutting surface 32*a* to be elastically deformed in a direction that narrows the gap 60 by the amount of the gap 60 when being held in the closed position with the predetermined load being applied from the driving rod 31.

Thus, by providing the gap 60 between the support surface 31*b* of the driving rod 31 and the facing surface 32*b* of the sealing member 32, even when the abutting surface 32*a* of the sealing member 32 is affected by heat, the sealing member 32 being held in the closed position by the predetermined load applied from the driving rod 31 can undergo further elastic deformation in the direction that narrows the gap 60, thus providing adhesion of the abutting surface 32*a* to the sealing surface 22 and preventing liquid leakage. For example, even when deformation or distortion occurs in the abutting surface 32*a* due to heat, the sealing member 32 can undergo further elastic deformation in the direction that narrows the gap 60, while being held in the closed position by the predetermined load applied from the driving rod 31, thereby absorbing the deformation or the distortion, and thus, the adhesion to the sealing surface 22 can be provided.

In the present embodiment, a dimension in an axial direction of the male thread portion 32*c* is set to be larger than a dimension in the axial direction of the threaded hole 31*c*, and a gap 60 with a thickness corresponding to the difference in the dimensions is provided between the support surface 31*b* and the facing surface 32*b*.

According to this configuration, the gap 60 with a predetermined thickness can be easily and securely provided between the support surface 31*b* and the facing surface 32*b*, by screwing the male thread portion 32*c* into the threaded hole 31*c* with a predetermined torque until an end surface (upper end surface) of the male thread portion 32*c* abuts a bottom surface of the threaded hole 31*c*.

Figure 6:
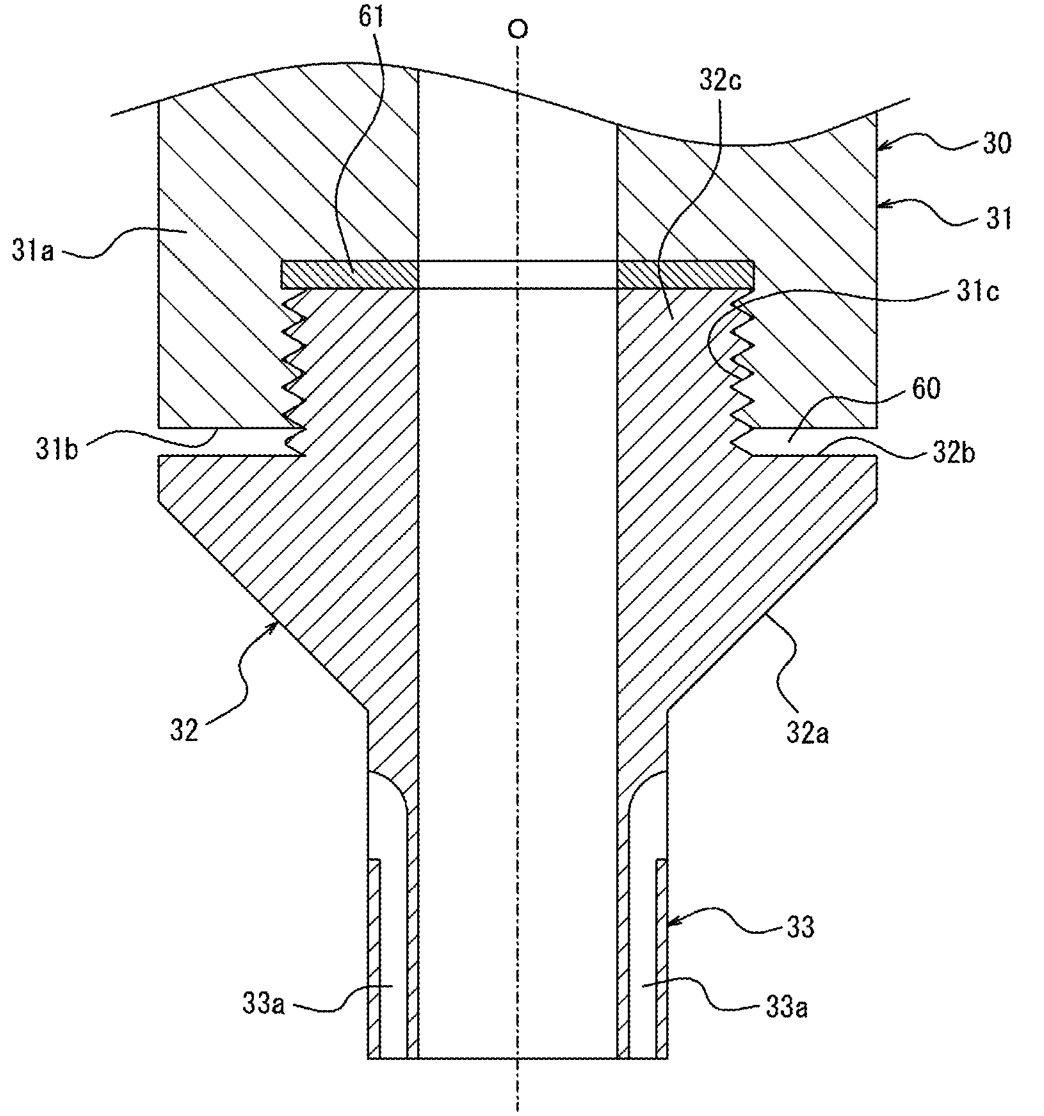
FIG. 6 is an enlarged sectional view illustrating part of a sealing member and a driving rod according to a modification.

As illustrated in FIG. 6, the dimension in the axial direction of the male thread portion 32*c* may be set to be equal to the dimension in the axial direction of the threaded hole 31*c*, and a spacer 61 with a predetermined thickness that is formed for example of stainless steel may be arranged between the end surface (upper end surface) of the male thread portion 32*c* and the bottom surface of the threaded hole 31*c*. By doing so, a gap 60 with a thickness corresponding to the thickness of the spacer 61 may also be configured to be provided between the support surface 31*b* and the facing surface 32*b*.

According to this configuration, in contrast to the sealing member 32 and the driving rod 31 of a conventional liquid filling apparatus in which a gap 60 is not provided between the support surface 31*b* and the facing surface 32*b*, the gap 60 can be easily and inexpensively provided between the support surface 31*b* and the facing surface 32*b*, by arranging the spacer 61 between the end surface of the male thread portion 32*c* and the bottom surface of the threaded hole 31*c*, while the conventional sealing member 32 and driving rod 31 are used.

Figure 7:
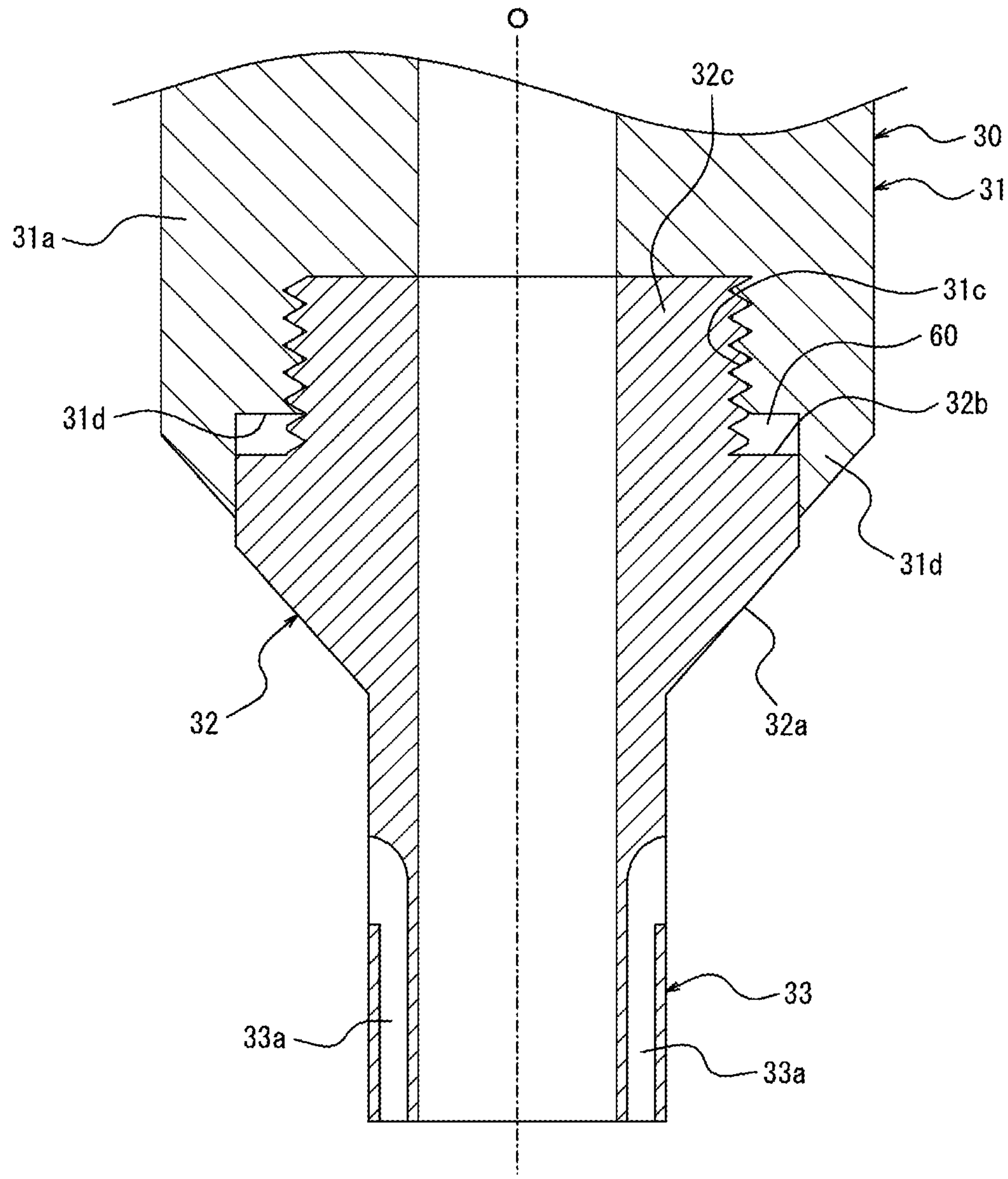
FIG. 7 is an enlarged sectional view illustrating part of a sealing member and a driving rod according to another modification.

As illustrated in FIG. 7, the support surface 31*b* can be configured to be integrally provided, at an outer circumferential edge thereof, with a stopper portion 31*d*. The stopper portion 31*d* has an annular shape surrounding an outer circumference of the sealing member 32, and its lower surface is a tapered surface that is offset upward in a stepped manner with respect to the abutting surface 32*a*. Additionally, there may be a radial gap between an inner circumferential surface of the stopper portion 31*d* and an outer circumferential surface of the sealing member 32, or the inner circumferential surface of the stopper portion 31*d* and the outer circumferential surface of the sealing member 32 may abut each other.

According to this configuration, even when an excessive load is unexpectedly applied to the sealing member 32 from the driving rod 31, the stopper portion 31*d* can abut the sealing surface 22, thereby preventing the sealing member 32 from being damaged due to excessive elastic deformation.

Needless to say, the present disclosure is not limited to the above embodiment, and various modifications can be made without departing from the gist of the present disclosure.

For example, although the above embodiment illustrates a case in which the liquid filling apparatus 1 constitutes a liquid blow molding apparatus used for liquid blow molding, the liquid filling apparatus 1 can also be used for filling a liquid as a content liquid into a container that has been formed in a predetermined shape in advance by blow molding or injection molding, without being limited to the case in which blow molding and filling are performed simultaneously.

Furthermore, although in the above embodiment the gap 60 has a constant thickness, the present disclosure is not limited to this. The thickness of the sealing member 32, which can be elastically deformed by a desired amount of displacement, may not be constant.

Moreover, although in the above embodiment the supply port 21 is configured in a cylindrical shape extending downward from the inner circumferential edge of the sealing surface 22, the present disclosure is not limited to this. The inner circumferential edge of the sealing surface 22 may be used as the supply port 21, without providing the cylindrical portion.

Moreover, although in the above embodiment the threaded hole 31*c* is provided on the support surface 31*b* of the driving rod 31 as an engaged portion, the male thread portion 32*c* is provided on the facing surface 32*b* of the sealing member 32 as an engaging portion, and the sealing member 32 is fixed to the driving rod 31 by screw-connecting the male thread portion 32*c* to the threaded hole 31*c*, the present disclosure is not limited to this. A threaded hole as an engaging portion may be provided on the facing surface 32*b* of the sealing member 32, and a male thread portion as an engaged portion that engages with the threaded hole may be provided on the support surface 31*b* of the driving rod 31. The sealing member 32 may also be configured to be fixed to the driving rod 31 by means other than screw connection, by using configurations other than the male thread portion and the threaded hole as an engaging portion and an engaged portion.

REFERENCE SIGNS LIST

1 Liquid filling apparatus
2 Filled object
2*a* Mouth
2*b* Body
3 Liquid
4 Mold

10 Main body block
11 Fluid supply channel
12 Pipe
13 Liquid supply channel
14 Stepped surface
15 Support block
20 Nozzle
21 Supply port
22 Sealing surface
23 Holding portion
24 Draw-in channel
30 Sealing body
31 Driving rod
31*a* Connecting portion
31*b* Support surface
31*c* Threaded hole (engaged portion)
31*d* Stopper portion
32 Sealing member
32*a* Abutting surface
32*b* Facing surface
32*c* Male thread portion (engaging portion)
33 Extended portion
33*a* Draw-in hole
40 Pipe
41 Negative pressure supply source
42 Opening and closing valve
50 Stretching rod
60 Gap
61 Spacer
O Axis

The invention claimed is:

1. A liquid filling apparatus that fills a filled object with a liquid, the liquid filling apparatus comprising:
- a liquid supply portion configured to supply the liquid into a liquid supply channel;
- a nozzle that includes a supply port connected to the liquid supply channel and a sealing surface provided on an upstream side of the supply port;
- a driving rod that includes a support surface facing the nozzle and an engaged portion provided on the support surface and that is arranged inside the liquid supply channel so as to be freely movable in a vertical direction; and
- a synthetic resin sealing member that includes an abutting surface facing the sealing surface, a facing surface facing the support surface, and an engaging portion provided on the facing surface and that is configured to move along with the driving rod between a closed position, in which the engaging portion engages with the engaged portion and is fixed to the driving rod, and the abutting surface abuts the sealing surface to thereby close the supply port, and an open position, in which the abutting surface moves away from the sealing surface to thereby open the supply port, wherein
- a gap is provided between the support surface and the facing surface,
- the engaging portion comprises a male thread portion protruding from the facing surface,
- the engaged portion comprises a threaded hole, and
- a dimension in an axial direction of the engaging portion is set to be larger than a dimension in the axial dimension of the engaged portion.

2. A liquid filling apparatus that fills a filled object with a liquid, the liquid filling apparatus comprising:
- a liquid supply portion configured to supply the liquid into a liquid supply channel;
- a nozzle that includes a supply port connected to the liquid supply channel and a sealing surface provided on an upstream side of the supply port;
- a driving rod that includes a support surface facing the nozzle and an engaged portion provided on the support surface and that is arranged inside the liquid supply channel so as to be freely movable in a vertical direction; and
- a synthetic resin sealing member that includes an abutting surface facing the sealing surface, a facing surface facing the support surface, and an engaging portion provided on the facing surface and that is configured to move along with the driving rod between a closed position, in which the engaging portion engages with the engaged portion and is fixed to the driving rod, and the abutting surface abuts the sealing surface to thereby close the supply port, and an open position, in which the abutting surface moves away from the sealing surface to thereby open the supply port, wherein
- a gap is provided between the support surface and the facing surface,
- the engaging portion comprises a male thread portion protruding from the facing surface,
- the engaged portion comprises a threaded hole, and
- a dimension in an axial direction of the engaging portion is set to be equal to a dimension in the axial dimension of the engaged portion, and a spacer member is arranged between an end surface of the engaging portion and a bottom surface of the engaged portion.

* * * * *